United States Patent
Yang et al.

(10) Patent No.: US 11,791,949 B2
(45) Date of Patent: Oct. 17, 2023

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/159,490

(22) Filed: Jan. 25, 2023

(65) Prior Publication Data
US 2023/0171044 A1 Jun. 1, 2023

Related U.S. Application Data

(63) Continuation of application No. 17/771,857, filed as application No. PCT/KR2022/000320 on Jan. 7, 2022.

(60) Provisional application No. 63/254,157, filed on Oct. 10, 2021.

(30) Foreign Application Priority Data

Jan. 15, 2021 (KR) .................. 10-2021-0006244

(51) Int. Cl.
*H04W 72/00* (2023.01)
*H04L 1/1829* (2023.01)
*H04W 72/21* (2023.01)
*H04L 5/00* (2006.01)
*H04L 1/1812* (2023.01)

(52) U.S. Cl.
CPC .......... *H04L 1/1854* (2013.01); *H04L 1/1861* (2013.01); *H04L 5/0053* (2013.01); *H04W 72/21* (2023.01); *H04L 1/1812* (2013.01)

(58) Field of Classification Search
CPC ... H04L 5/0053; H04L 5/0055; H04L 5/0057; H04W 72/10; H04W 72/1242; H04W 72/1247; H04W 72/0875
See application file for complete search history.

(56) References Cited

U.S. PATENT DOCUMENTS

2019/0342878 A1   11/2019  Kim et al.
2022/0029753 A1*   1/2022  Papasakellariou .... H04L 1/1854
2022/0183025 A1*   6/2022  Fröberg ............... H04L 1/0042

OTHER PUBLICATIONS

International Search Report in International Appln. No. PCT/KR2022/000320, dated Apr. 21, 2022, 9 pages.
(Continued)

*Primary Examiner* — Bo Hui A Zhu
(74) *Attorney, Agent, or Firm* — Fish & Richardson P.C.

(57) ABSTRACT

A UE according to an embodiment of the present disclosure may receive information about a plurality of beta offset values for determining the number of REs for UCI to be transmitted on a PUSCH, receive DCI scheduling a first PUSCH, and transmit a first HARQ-ACK on the first PUSCH, and transmit the first PUSCH. The plurality of beta offset values may include first beta offset values for a case where the priority of the first HARQ-ACK is identical to the priority of the first PUSCH, and second beta offset values for a case where the priority of the first HARQ-ACK is different from the priority of the first PUSCH.

19 Claims, 12 Drawing Sheets

(56) References Cited

OTHER PUBLICATIONS

LG Electronics, "Discussion on Intra-UE multiplexing/prioritization," R1-2008060, Presented at 3GPP TSG RAN WG1 #103-e, e-Meeting, Oct. 26-Nov. 13, 2020, 11 pages.

Samsung, "Uplink intra-UE multiplexing and prioritization," R1-2008162, Presented at 3GPP TSG RAN WG1 #103-e, e-Meeting, Oct. 26-Nov. 13, 2020, 6 pages.

Sony, "Considerations in intra-UE UL multiplexing," R1-2008358, Presented at 3GPP TSG RAN WG1 #103-e, e-Meeting, Oct. 26-Nov. 13, 2020, 4 pages.

ZTE, "Discussion on enhanced intra-UE multiplexing," R1-2008824, Presented at 3GPP TSG RAN WG1 #103-e, e-Meeting, Oct. 26-Nov. 13, 2020, 9 pages.

* cited by examiner

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of U.S. application Ser. No. 17/771,857, filed on Apr. 26, 2022, which is a National Stage application under 35 U.S.C. § 371 of International Application No. PCT/KR2022/000320, filed on Jan. 7, 2022, which claims the benefit of U.S. Provisional Application No. 63/254,157, filed on Oct. 10, 2021, and Korean Application No. 10-2021-0006244, filed on Jan. 15, 2021. The disclosures of the prior applications are hereby incorporated by reference herein in their entirety.

TECHNICAL FIELD

The present disclosure relates to a wireless communication system, and more particularly, to a method and apparatus for transmitting or receiving a downlink/uplink radio signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of transmitting a signal by a user equipment (UE) in a wireless communication system may include encoding a plurality of pieces of uplink control information (UCI) including first-type UCI and second-type UCI; performing resource mapping for encoded bits of the plurality of UCIs on one physical uplink channel; and performing an uplink transmission based on the resource mapping. Even though the first-type UCI and the second-type UCI have different priorities, the UE may be configured to multiplex the plurality of UCIs on the one physical uplink channel. Based on the first-type UCI including configured grant (CG)-UCI for a CG operation, the second UCI including a hybrid automatic repeat request-acknowledgement (HARQ-ACK), and the CG-UCI and the HARQ-ACK having different priorities, the UE may perform (i) the encoding on each of the CG-UCI and the HARQ-ACK and (ii) the resource mapping on each of the CG-UCI and the HARQ-ACK.

In a state in which a second priority higher than a first priority is assigned to the one physical uplink channel, the UE may determine the number of resources to be allocated to the HARQ-ACK from among remaining resources after determining the number of resources to be allocated to the CG-UCI. For example, based on the CG-UCI being two or fewer bits, the UE may perform the resource mapping on the HARQ-ACK for remaining resources except for reserved resources, and perform the resource mapping on the CG-UCI by puncturing of the reserved resources. For example, based on the CG-UCI being more than two bits, the UE may perform the resource mapping on the HARQ-ACK after the resource mapping on the CG-UCI.

In a state in which a second priority higher than a first priority is assigned to the one physical uplink channel, the UE may determine the number of resources to be allocated to the CG-UCI from among remaining resources after determining the number of resources to be allocated to the HARQ-ACK. For example, based on the HARQ-ACK being two or fewer bits, the UE may perform the resource mapping on the CG-UCI for remaining resources except for reserved resources, and perform the resource mapping on the HARQ-ACK by puncturing of the reserved resources. For example, based on the HARQ-ACK being more than two bits, the UE may perform the resource mapping on the CG-UCI after the resource mapping on the HARQ-ACK.

The one physical uplink channel is a configured grant-physical uplink shared channel (CG-PUSCH), and a priority of the CG-PUSCH may be different from the priority of the HARQ-ACK.

Joint encoding of the CG-UCI and the HARQ-ACK having different priorities, multiplexed on the one physical uplink channel may not be allowed. For example, the CG-UCI may be joint-encoded with a specific HARQ-ACK having the same priority as that of the CG-UCI, and a result of the joint encoding may be encoded separately from an HARQ-ACK included in the second-type UCI.

According to another aspect of the present disclosure, a processor-readable recording medium storing a program for performing the above-described signal transmission method may be provided.

According to another aspect of the present disclosure, a UE for performing the above-described signal transmission method may be provided.

According to another aspect of the present disclosure, a device for controlling the UE performing the above-described signal transmission method may be provided.

According to an aspect of the present disclosure, a method of receiving a signal by a base station (BS) in a wireless communication system may include receiving encoded bits of a plurality of pieces of uplink control information (UCI) multiplexed on one physical uplink channel; and obtaining first-type UCI and second-type UCI by decoding the encoded bits of the plurality of UCIs. Even though the first-type UCI and the second-type UCI have different priorities, the BS may configure the UE to multiplex the plurality of UCIs on the one physical uplink channel. Based on the first-type UCI including configured grant (CG)-UCI for a CG operation, the second UCI including a hybrid automatic repeat request-acknowledgement (HARQ-ACK), and the CG-UCI and the HARQ-ACK having different priorities, the BS may (i) determine resource mapping for each of the CG-UCI and the HARQ-ACK and (ii) decode each of the CG-UCI and the HARQ-ACK.

According to another aspect of the present disclosure, a BS for performing the above-described signal transmission method may be provided.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
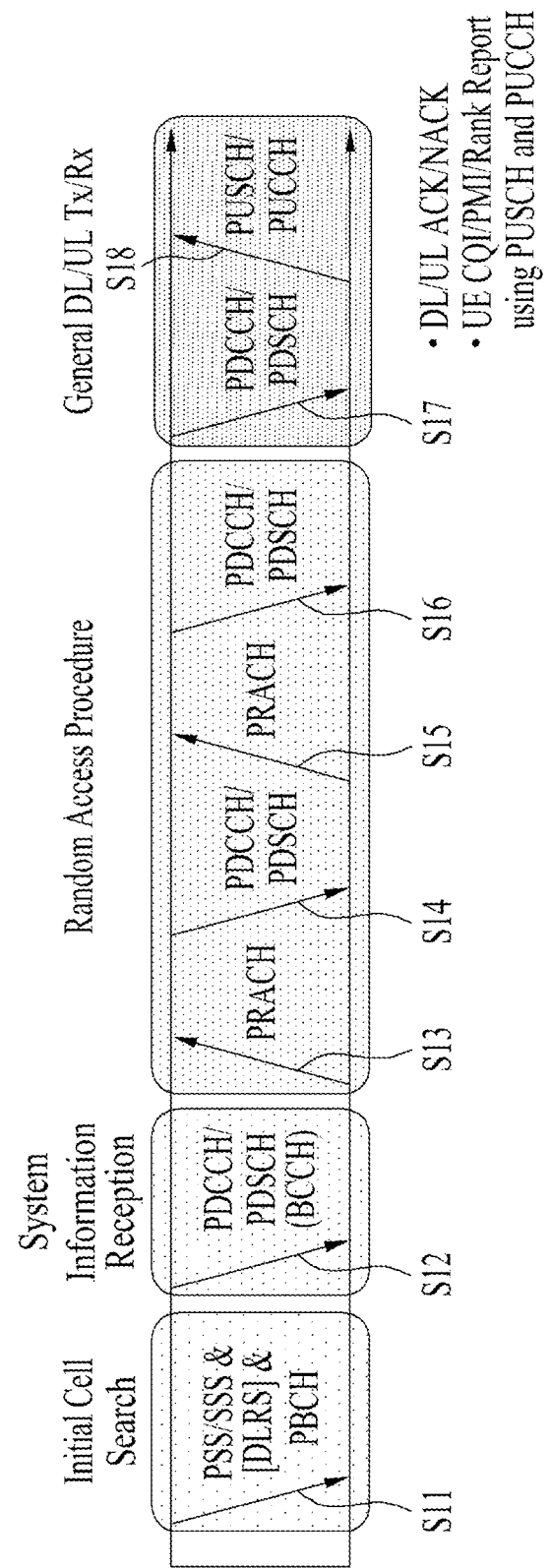
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
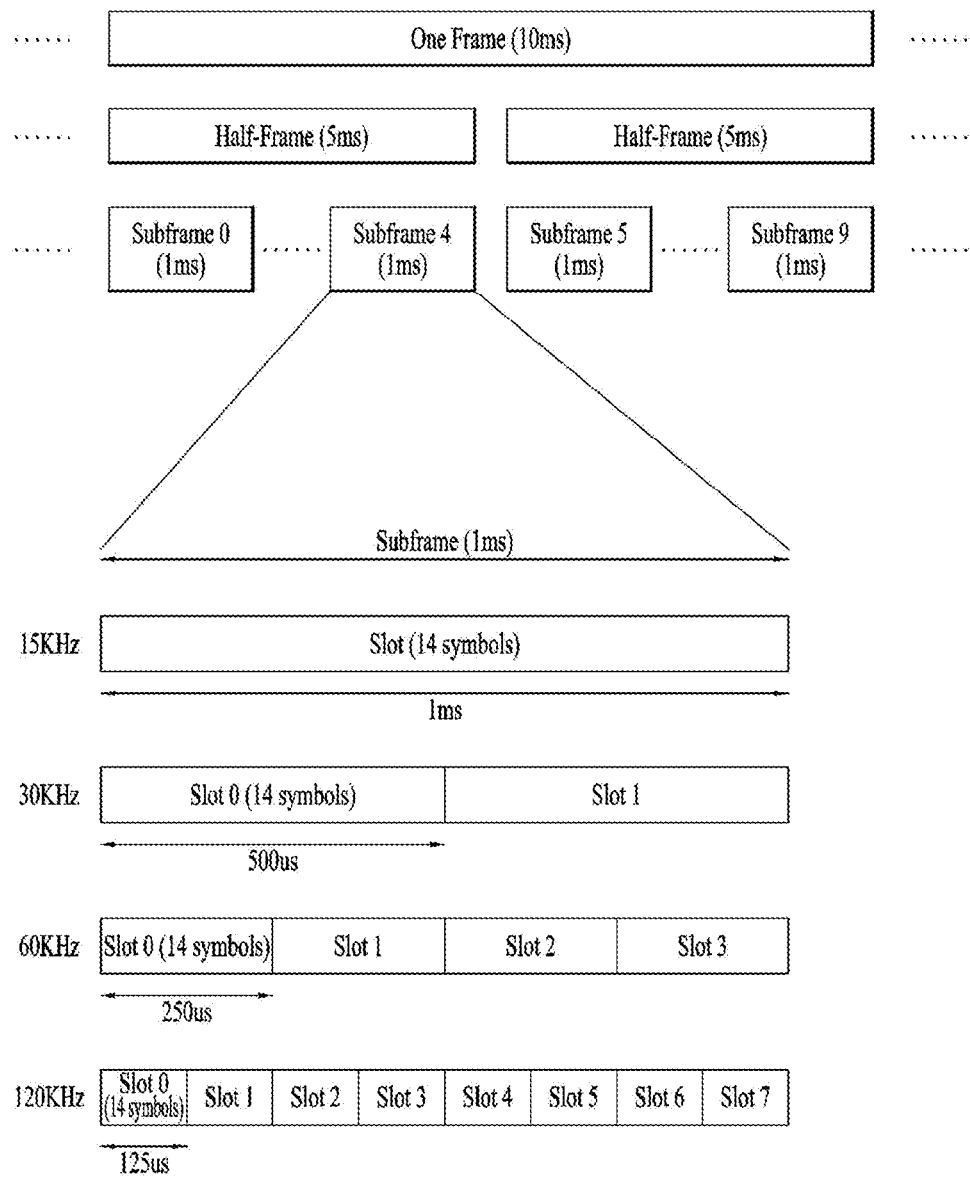
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
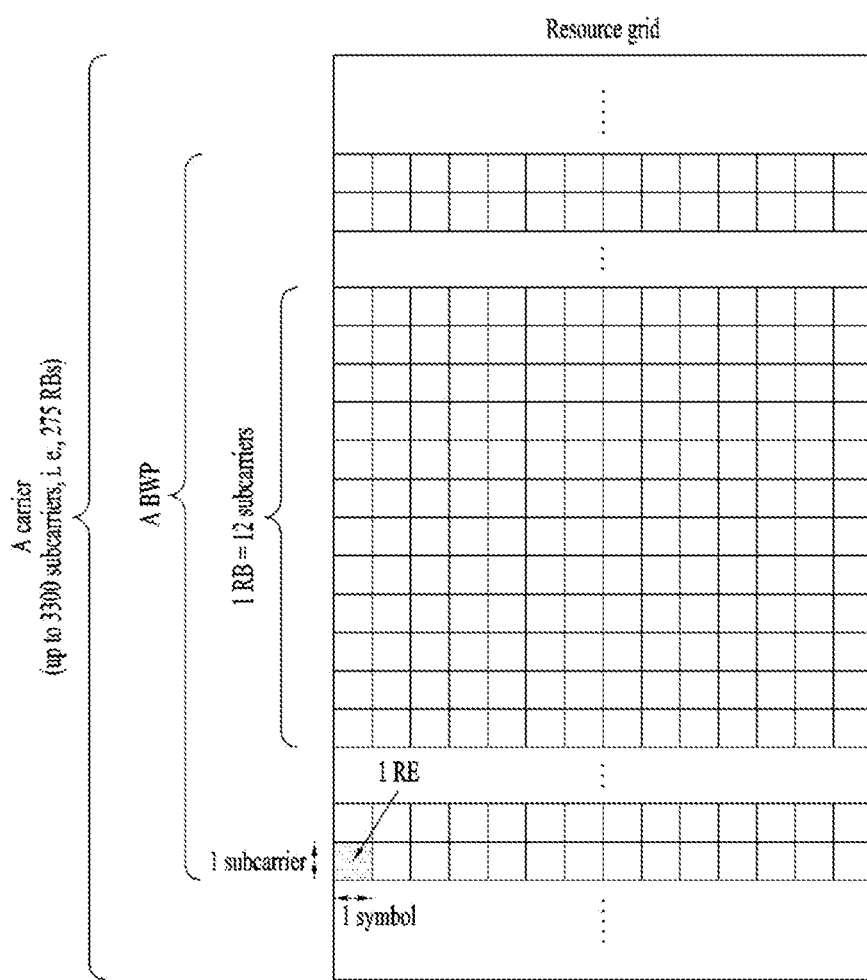
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
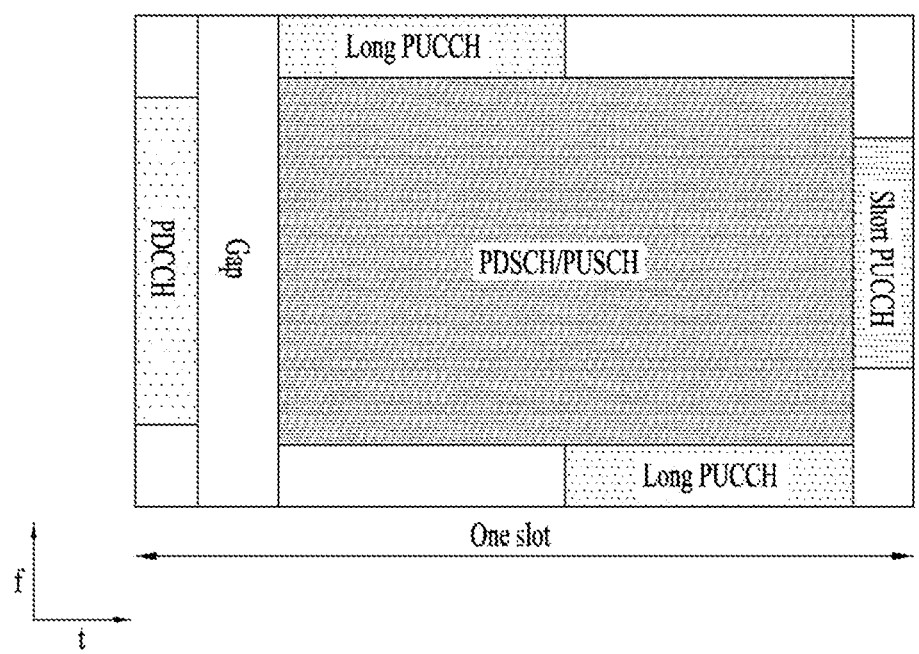
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
monitoringSlotPeriodicityAndOffset: A PDCCH monitoring periodicity (in slots) and a PDCCH monitoring offset (in slots).
monitoringSymbolsWithinSlot: PDCCH monitoring symbols in a slot (e.g., the first symbol(s) of a CORESET).
nrofCandidates: The number of PDCCH candidates (one of 0, 1, 2, 3, 4, 5, 6, and 8) for each AL={1, 2, 4, 8, 16}.
An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR(Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
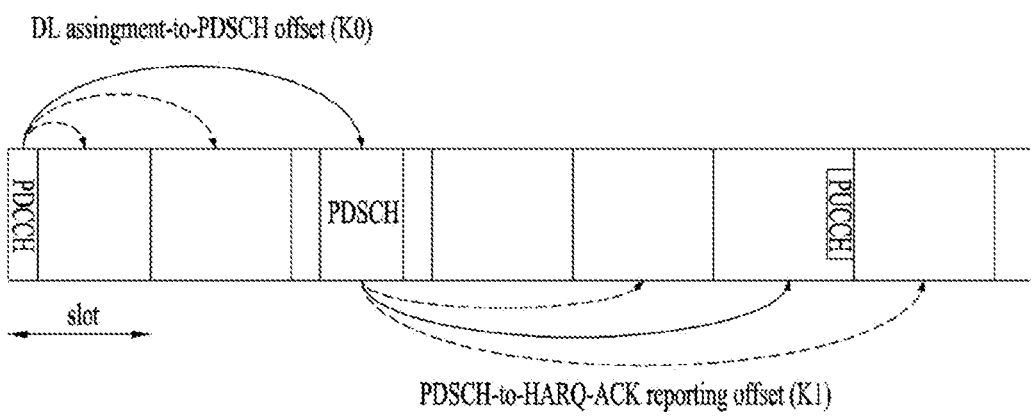
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): PUCCH 자원 세트 내의 복수의 PUCCH 자원들 중에서 UCI 전송에 사용될 PUCCH 자원을 지시함

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
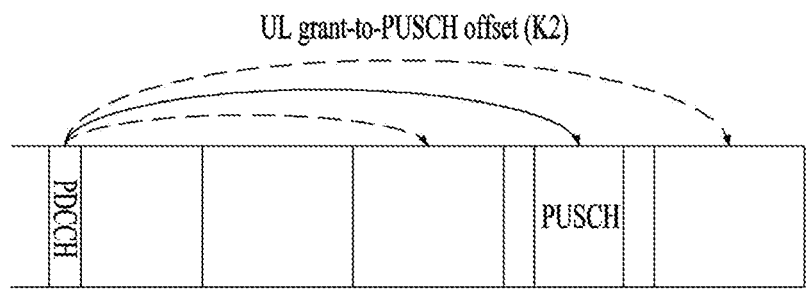
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
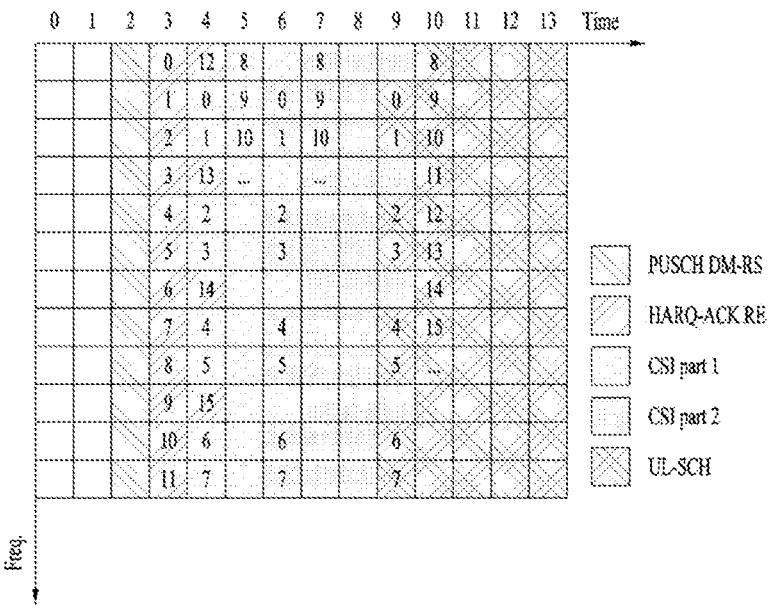
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

For piggyback of an HARQ-ACK in NR Rel.16, when the payload of the HARQ-ACK is 2 or fewer bits, a PUSCH data RE (and/or a CSI part 2 RE) is punctured, whereas when the payload of the HARQ-ACK is larger than 2 bits, rate matching is performed. Table 6 describes HARQ-ACK rate matching of UCI in TS38.212.

TABLE 6

6.3.2.4 Rate matching
6.3.2.4.1 UCI encoded by Polar code
6.3.2.4.1.1 HARQ-ACK
For HARQ-ACK transmission on PUSCH with UL-SCH, the number of coded modulation symbols per layer for HARQ-ACK transmission, denoted as $Q'_{ACK}$, is determined as follows:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where
$O_{ACK}$ is the number of HARQ-ACK bits;
if $O_{ACK} \geq 360$, $L_{ACK} = 11$; otherwise $L_{ACK}$ is the number of CRC bits for HARQ-ACK determined according to Clause 6.3.1.2.1;
$\beta_{offset}^{PUSCH} = \beta_{offset}^{HARQ-ACK}$;

TABLE 6-continued $C_{UL-SCH}$ is the number of code blocks for UL-SCH of the PUSCH transmission;
if the DCI format scheduling the PUSCH transmission includes a CBGTI field indicating
that the UE shall not transmit the r-th code block, $K_r = 0$; otherwise, $K_r$ is the
r-th code block size for UL-SCH of the PUSCH transmission;
$M_{sc}^{PUSCH}$ the scheduled bandwidth of the PUSCH transmission, expressed as a
number of subcarriers;
$M_{sc}^{PT-RS}(l)$ is the number of subcarriers in OFDM symbol l that carries PTRS, in the
PUSCH transmission;
$M_{sc}^{UCI}(l)$ is the number of resource elements that can be used for transmission of
UCI in OFDM symbol l, for $l = 0, 1, 2, \ldots, N_{symb,all}^{PUSCH} - 1$, in the PUSCH transmission
and $N_{symb,all}^{PUSCH}$ is the total number of OFDM symbols of the PUSCH, including all
OFDM symbols used for DMRS;
    for any OFDM symbol that carries DMRS of the PUSCH, $M_{sc}^{UCI}(l) = 0$;
    for any OFDM symbol that does not carry DMRS of the PUSCH,
    $M_{sc}^{UCI}(l) = M_{sc}^{PUSCH} - M_{sc}^{PT-RS}(l)$;
    α is configured by higher layer parameter scaling;
    $l_0$ is the symbol index of the first OFDM symbol that does not carry DMRS of the
    PUSCH, after the first DMRS symbol(s), in the PUSCH transmission.
For HARQ-ACK transmission on an actual repetition of a PUSCH with repetition Type B with
UL-SCH, the number of coded modulation symbols per layer for HARQ-ACK transmission,
denoted as $Q'_{ACK}$, is determined as follows:

$$Q'_{ACK} = \min\left\{\left[\frac{(O_{ACK} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right], \left[\alpha \cdot \sum_{l=0}^{N_{symb,nominal}^{PUSCH}-1} M_{sc,nominal}^{UCI}(l)\right], \sum_{l=0}^{N_{symb,actual}^{PUSCH}-1} M_{sc,actual}^{UCI}(l)\right\}$$

where
$M_{sc,nominal}^{UCI}(l)$ is the number of resource elements that can be used for transmission of UCI in
OFDM symbol l, $l = 0, 1, 2, \ldots, N_{symb,nominal}^{PUSCH} - 1$, in the PUSCH transmission
assuming a nominal repetition without segmentation, and $N_{symb,nominal}^{PUSCH}$ is the total number of OFDM
symbols in a nominal repetition of the PUSCH, including all OFDM symbols used for DMRS;
    for any OFDM symbol that carries DMRS of the PUSCH assuming a nominal repetition without
    segmentation, $M_{sc,nominal}^{UCI}(l) = 0$;
    for any OFDM symbol that does not carry DMRS of the PUSCH assuming a nominal repetition
    without segmentation, $M_{sc,nominal}^{UCI}(l) = M_{sc}^{PUSCH} - M_{sc,nominal}^{PT-RS}(l)$ where
    $M_{sc,nominal}^{PT-RS}(l)$ is the number of subcarriers in OFDM symbol l that carries PTRS, in the PUSCH
    transmission assuming a nominal repetition without segmentation;
$M_{sc,actual}^{UCI}(l)$ is the number of resource elements that can be used for transmission of UCI in OFDM
symbol l, for $l = 0, 1, 2, \ldots, N_{symb,actual}^{PUSCH} - 1$, in the actual repetition of the PUSCH
transmission, and $N_{symb,actual}^{PUSCH}$ is the total number of OFDM symbols in the actual repetition of the
PUSCH transmission, including all OFDM symbols used for DMRS;
    for any OFDM symbol that carries DMRS of the actual repetition of the PUSCH transmission,
    $M_{sc,actual}^{UCI}(l) = 0$;
    for any OFDM symbol that does not carry DMRS of the actual repetition of the PUSCH transmission,
    $M_{sc,actual}^{UCI}(l) = M_{sc}^{PUSCH} - M_{sc,actual}^{PT-RS}(l)$ where $M_{sc,actual}^{PT-RS}(l)$ is the number
    of subcarriers in OFDM symbol l that carries PTRS, in the actual repetition of the PUSCH
    transmission;
and all the other notations in the formula are defined the same as for PUSCH not using repetition type B.
For HARQ-ACK transmission on PUSCH without UL-SCH, the number of coded modulation
symbols per layer for HARQ-ACK transmission, denoted as $Q'_{ACK}$, is determined as follows:

$$Q'_{ACK} = \min\left\{\left[\frac{(O_{ACK} + L_{ACK}) \cdot \beta_{offset}^{PUSCH}}{R \cdot Q_m}\right], \left[\alpha \cdot \sum_{l=l_0}^{N_{symb,all}^{PUSCH}-1} M_{sc}^{UCI}(l)\right]\right\}$$

where
$O_{ACK}$ is the number of HARQ-ACK bits;
if $O_{ACK} \geq 360$, $L_{ACK} = 11$; otherwise $L_{ACK}$ is the number of CRC bits for
HARQ-ACK defined according to Clause 6.3.1.2.1;;
$\beta_{offset}^{PUSCH} = \beta_{offset}^{HARQ-ACK}$;
$M_{sc}^{PUSCH}$ is the scheduled bandwidth of the PUSCH transmission, expressed as a
number of subcarriers;
$M_{sc}^{PT-RS}(l)$ is the number of subcarriers in OFDM symbol l that carries PTRS, in
the PUSCH transmission;

TABLE 6-continued $M_{sc}^{UCI}(l)$ is the number of resource elements that can be used for transmission of UCI in OFDM symbol l, for l = 0, 1, 2, . . . , $N_{symb,all}^{PUSCH}$ − 1, in the PUSCH transmission and $N_{symb,all}^{PUSCH}$ is the total number of OFDM symbols of the PUSCH, including all OFDM symbols used for DMRS;
   for any OFDM symbol that carries DMRS of the PUSCH, $M_{sc}^{UCI}(l) = 0$;
   for any OFDM symbol that does not carry DMRS of the PUSCH,
   $M_{sc}^{UCI}(l) = M_{sc}^{PUSCH} - M_{sc}^{PT-RS}(l)$;

In Table 6, a beta offset '$\beta_{offset}^{PUSCH}$' is a weight for rate matching of UCI on a PUSCH, and is related to the amount of resources to be used for an HARQ-ACK and a CSI report when the PUSCH is transmitted. A $\beta_{offset}$ set s may be configured through higher-layer signaling. A specific $\beta_{offset}$ set may be used semi-statically, or a $\beta_{offset}$ set may be dynamically indicated by DCI (e.g., UL grant DCI format 0_1/0_2). In the dynamic $\beta_{offset}$ indication method, a beta offset indication field of DCI includes 2 bits indicating one of four $\beta_{offset}$ sets configured for the UE. Each $\beta_{offset}$ set includes three $\beta_{offset}$ values applicable to an HARQ-ACK, two $\beta_{offset}$ values for CSI part 1, and two $\beta_{offset}$ values for CSI part 2, and a specific $\beta_{offset}$ value is selected according to the size of corresponding payload. For example, a first $\beta_{offset}^{HARQ-ACK}$ value may be used to transmit M HARQ-ACKs on the PUSCH, and a second $\beta_{offset}^{HARQ-ACK}$ value may be used for transmitting N HARQ-ACKs on the PUSCH.

NR-Shared Spectrum/Unlicensed Band (NR-U) Operation

A communication node (e.g., a BS or a UE) operating in an unlicensed band should determine whether other communication node(s) is using a channel, before transmitting a signal.

Definitions of terms related to NR-U operations:
Channel: A carrier or a part of a carrier including consecutive RBs in which a channel access procedure (CAP) is performed in a shared spectrum.
Channel access procedure (CAP): A procedure of evaluating the availability of a channel based on sensing to determine whether the channel is used by other communication node(s), before a signal transmission. A CAP may be referred to as listen-before-talk (LBT).
Channel occupancy: Transmission(s) on channel(s) from a BS/UE after a CAP.
Channel occupancy time (COT): A total time for which the BS/UE and any BS/UE(s) sharing the channel occupancy perform transmission(s) on the channel after the BS/UE corresponding CAPs. When a COT is determined, if a transmission gap is less than or equal to 25 us, the gap duration may also be counted in the COT. The COT may be shared for transmission between the BS and corresponding UE(s).

If a sub-band (SB) in which LBT is performed individually is defined as an LBT-SB, a plurality of LBT-SBs may be included in one wideband cell/BWP. An RB set forming an LBT-SB may be configured through higher-layer signaling (e.g., RRC signaling). Accordingly, one cell/BWP may include one or more LBT-SBs based on (i) the BW of a cell/BWP and (ii) RB set allocation information. A plurality of LBT-SBs may be included in a BWP of a cell (or carrier). An LBT-SB may have, for example, a band of 20 MHz. An LBT-SB may include a plurality of consecutive (P)RBs in the frequency domain, and may be referred to as a (P)RB set. While not shown, a guard band (GB) may be included between LBT-SBs. Accordingly, a BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SBs/RBs may be configured/defined to be indexed increasingly from a lower frequency band to a higher frequency band.

(1) Type 1 CAP Method

ABS in a type 1 DL CAP and a UE in a type 1 UL CAP may detect whether a channel is idle during sensing slot durations of a defer duration Td, and after a counter N is zero, perform a transmission. The counter N is adjusted by sensing the channel for additional sensing slot duration(s) according to the following procedure:

Step 1) set N=Ninit where Ninit is a random number uniformly distributed between 0 and CWp, and go to step 4.

Step 2) if N>0 and the BS chooses to decrement the counter, set N=N−1.

Step 3) sense the channel for an additional sensing slot duration, and if the additional sensing slot duration is idle, go to step 4; else, go to step 5.

Step 4) if N=0 (Y), stop; else, go to step 2,

Step 5) sense the channel until either a busy sensing slot is detected within an additional defer duration Td or all the sensing slots of the additional defer duration Td are detected to be idle.

Step 6) if the channel is sensed to be idle during all the sensing slot durations of the additional defer duration Td, go to step 4; else, go to step 5.

A type 1 UL CAP may be applied to the following transmissions.
PUSCH/SRS transmission(s) scheduled and/or configured by the BS
PUCCH transmission(s) scheduled and/or configured by the BS
Transmission(s) related to a random access procedure (RAP)

A type 2 CAP is a CAP performed without random backoff. Type 2A, 2B, and 2C are defined for DL, and type 2A, 2B, and 2C are defined for UL. In a type 2A UL CAP, the UE may transmit a signal immediately after a channel is sensed as idle during at least a sensing duration Tshort_dl (=25 us). Tshort_dl includes one sensing slot duration and the immediately following duration Tf (=16 us). In a type 2A UL CAP, Tf includes a sensing slot at the beginning of the duration. In a type 2B UL CAP, the UE may transmit a signal immediately after a channel is sensed as idle for a sensing duration Tf (=16 us). In a type 2B UL CAP, Tf includes a sensing slot within the last 9 us of the duration. In a type 2C UL CAP, the UE does not sense a channel before performing a transmission.

Configured Grant (CG)

A semi-static configured grant (CG) may be configured for the UE by RRC signaling. Up to 12 active CGs may be configured for the UE in a corresponding BWP of a serving cell.

Each CG may be type 1 or type 2. A type 1 CG may be activated/deactivated independently between serving cells. When a plurality of type 2 CGs are configured, each type 2

CG may be individually activated by DCI. One DCI may deactivate one type 2 CG or a plurality of type 2 CGs.

For a CG-based transmission in NR-U (i.e., shared spectrum channel access), configured grant uplink control information (CG-UCI) is transmitted on a corresponding CG PUSCH (i.e., a PUSCH scheduled by a CG). Multiplexing between a PUCCH carrying CG-UCI and a PUCCH carrying an HARQ-ACK in NR-U may be configured/allowed by the BS. When multiplexing between a PUCCH carrying CG-UCI and a PUCCH carrying an HARQ-ACK is not configured, and the PUCCH carrying the HARQ-ACK overlaps with a CG PUSCH within a PUCCH group, the CG PUSCH transmission is dropped.

UCI Multiplexing On PUSCH For URLLC

To support a data transmission/service to which reliability/latency performance is important, such as URLLC, a service/protection priority (e.g., low priority (LP) or high priority (HP)) may be configured for the UE semi-statically (by RRC signaling) or dynamically (by DCI signaling or MAC signaling), for each physical channel/signal (transmission resource) (e.g., PUSCH) and control information (e.g., UCI).

Specifically, a priority indicator has been introduced to some DCI formats (e.g., DCI format 1_1/1_2 for DL, and DCI format 0_1/0_2 for UL) in NR Rel. 16. When the priority indicator is configured for a corresponding DCI format by higher-layer signaling, the UE blind-decodes the DCI format, assuming that the priority indicator exists. Without explicit signaling indicating that the priority indicator will be used for the DCI format, the UE blind-decodes the DCI format, assuming that the priority indicator is not included in the DCI format. When no priority information is provided for a corresponding DL/UL signal, the UE may assume LP (e.g., priority index=0) for the DL/UL signal. Those skilled in the art will understand that the priority indicator of DCI is one of various means for indicating/configuring a priority, not the only method.

In an example of the above-described prioritization, a lower priority index may be configured/indicated for LP, and a higher priority index may be configured/indicated for HP. Alternatively, a lower bit value (e.g., bit '0') may be configured/indicated for LP, and a higher bit value (e.g., bit '1') may be configured/indicated for HP.

For example, a priority (e.g., LP or HP) may be configured/indicated for each UCI type (e.g., HARQ-ACK, SR, and/or CSI) or for each PUCCH/PUSCH resource configured/indicated for each corresponding UCI transmission. For example, LP/HP may be indicated for an HARQ-ACK for a PDSCH by DL grant DCI that schedules the PDSCH. For example, in case of (aperiodic) CSI, LP/HP may be indicated by DCI (e.g., UL grant DCI scheduling a PUSCH). In another example, LP/HP may be configured/indicated as the priority (e.g., LP or HP) of a PUSCH by UL grant DCI scheduling the PUSCH.

In another example, (i) a PUCCH resource set may be configured independently for each priority, and/or (ii) a maximum coding rate for a PUCCH transmission may be configured independently for each priority. In another example, (iii) a beta offset βoffset for encoding UCI on a PUSCH (e.g., for an HARQ-ACK or CSI part 1/2. See Table 6) may be configured independently for each priority and/or (iv) an HARQ-ACK codebook type may be configured independently for each priority. At least one or a combination of (i) to (iv) may be used.

In Rel. 15/16 NR, two parameters, a beta offset (βoffset) and an alpha factor α are configured/used for UCI multiplexing (e.g. encoding/mapping) on a PUSCH (e.g., see Table 6). βoffset is a parameter that determines the coding rate of UCI, that is, the number of REs to which the UCI (coded bits) is mapped. βoffset may be configured/indicated for each individual UCI type. The alpha factor is a parameter that limits a maximum number of REs available for mapping the whole UCI (an upper limit for multiplexed UCI REs). The alpha factor α may be indicated by a higher-layer parameter 'scaling', and may also be referred to as a scaling factor α in some cases.

Table 7 illustrates a configuration structure/method related to βoffset and the alpha factor in 15/16 NR.

TABLE 7

1) Semi-static $\beta_{offset}$
  A. The following seven $\beta_{offset}$ values in total may be set by RRC signaling (i.e., semi-static signaling).
    i. Three $\beta_{offset}$ values {B_a1, B_a2, B_a3} applied to three HARQ-ACK sizes {up to 2 bits, up to 11 bits, and more than 11 bits}
    ii. Two $\beta_{offset}$ values {B_c11, B_c12} applied to two sizes of CSI part 1 {up to 11 bits and more than 11 bits}
    iii. Two $\beta_{offset}$ values {B_c21, B_c22} applied to two sizes of CSI part 2 {up to 11 bits and more than 11 bits}
  B. Each of the $\beta_{offset}$ values {B_a1, B_a2, B_a3} may be a value of 1.0 to 126, and each of the $\beta_{offset}$ values {B_c11, B_c12} and {B_c21, B_c22} may be a value of 1.125 to 20.
2) Dynamic $\beta_{offset}$
  A. Considering the above seven $\beta_{offset}$ values as a single $\beta_{offset}$ set, a total of four $\beta_{offset}$ sets (i.e., a total of 7*4 $\beta_{offset}$ values) may be configured for one UE through RRC signaling.
According to the dynamic $\beta_{offset}$ indication scheme, one of the total four $\beta_{offset}$ sets preconfigured by RRC signaling may be dynamically indicated by DCI.
  B. The $\beta_{offset}$ (set) indicated by the DCI is applied to multiplexing of UCI on a PUSCH scheduled by UL DCI format 0_1/0_2.
A semi-static $\beta_{offset}$ value to be applied when a dynamic $\beta_{offset}$ value is not indicated (e.g., a fallback PUSCH scheduled in UL DCI format 0_0 or a CG PUSCH transmitted based on a configured grant (CG)) may be separately configured (a semi-static $\beta_{offset}$ value may be configured in addition to the four $\beta_{offset}$ sets for Dynamic $\beta_{offset}$
3) Alpha factor (semi-static (only))
  A. Only one value selected from {0.5, 0.65, 0.8, 1.0} is configured for the UE by RRC signaling (e.g., the higher-layer parameter scaling), and the configured alpha factor value is applied to all UCI multiplexing cases on PUSCH.

Table 8 is a partial excerpt of an NR standard document, 3GPP TS38.213 Re. 16 related to Dynamic $\beta_{offset}$ described with reference to Table 7.

TABLE 8

Table 9.3-3: Mapping of four
beta_offset indicator values to offset indexes

| beta_offset indicator | ($I_{offset,0}^{HARQ\_ACK}$ or $I_{offset,1}^{HARQ\_ACK}$ or $I_{offset,2}^{HARQ\_ACK}$), ($I_{offset,0}^{CSI-1}$ or $I_{offset,0}^{CSI-2}$), ($I_{offset,1}^{CSI-1}$ or $I_{offset,1}^{CSI-2}$) |
|---|---|
| '00' | 1st offset index provided by higher layers |
| '01' | 2nd offset index provided by higher layers |

TABLE 8-continued

| '10' | $3^{rd}$ offset index provided by higher layers |
| '11' | $4^{th}$ offset index provided by higher layers |

Table 9.3-3A: Mapping of two
beta offset indicator values to offset indexes

| beta_offset indicator | ($I_{offset,0}^{HARQ\_ACK}$ or $I_{offset,1}^{HARQ\_ACK}$ or $I_{offset,2}^{HARQ\_ACK}$), ($I_{offset,0}^{CSI-1}$ or $I_{offset,0}^{CSI-2}$), ($I_{offset,1}^{CSI-1}$ or $I_{offset,1}^{CSI-2}$) |
|---|---|
| '0' | $1^{st}$ offset index provided by higher layers |
| '1' | $2^{nd}$ offset index provided by higher layers |

To describe Dynamic $\beta_{offset}$ of NR Rel. 16, a beta_offset-field indicator indicating a dynamic $\beta_{offset}$ value in DCI may be 2 bits ("Table 9.3-3" in Table 8) or 1 bit ("Table 9.3-3A" in Table 8) depending on a DCI configuration/format. When the beta_offset indicator field of the DCI is two bits, four $\beta_{offset}$ sets are configured through higher-layer signaling (RRC signaling) (1st/2nd/3rd/4th offset index provided by higher layers in "Table 9.3-3" of Table 8), whereas when the beta_offset indicator field of the DCI is one bit, two $\beta_{offset}$ sets are configured through higher-layer signaling (RRC signaling) (1st/2nd offset index provided by higher layers in "Table 9.3-3A" of Table 8). Each $\beta_{offset}$ set includes seven $\beta_{offset}$ values, and the seven $\beta_{offset}$ offset values are given as ($I_{offset,0}^{HARQ-ACK}$ or $I_{offset,1}^{HARQ-ACK}$ or $I_{offset,2}^{HARQ-ACK}$), ($I_{offset,0}^{CSI-1}$ or $I_{offset,0}^{CSI-2}$), ($I_{offset,1}^{CSI-1}$ or $I_{offset,1}^{CSI-2}$). These seven $\beta_{offset}$ values are {B_a1, B_a2, B_a3}, {B_c11, B_c12}, {B_c21, B_c22} of Table 7, sequentially. "( ... or ... or)" means that any one of the corresponding $\beta_{offset}$ values is selected. For example, on the assumption that the beta_offset indicator=01 is indicated to the UE and thus an HARQ-ACK is included in UCI, the UE selects the 2nd $\beta_{offset}$ set based on the beta_offset indicator=01. (a) when the size of an HARQ-ACK is less than or equal to two bits, the UE selects B_a1 (=$I_{offset,0}^{HARQ-ACK}$) from the selected 2nd $\beta_{offset}$ set, (b) when the size of the HARQ-ACK is greater than two bits and less than or equal to 11 bits, the UE selects B_a2 (=$I_{offset,1}^{HARQ-ACK}$) from the selected 2nd $\beta_{offset}$ set, and (c) when the size of the HARQ-ACK is greater than 11 bits, the UE selects B_a3 (=$I_{offset,1}^{HARQ-ACK}$) from the selected 2nd $\beta_{offset}$ set. On the other hand, since one $\beta_{offset}$ set is configured in the semi-static $\beta_{offset}$ indication scheme, $\beta_{offset}$ set is not indicated by the beta_offset indicator of DCI.

Therefore, the present disclosure proposes a method of configuring/indicating $\beta_{offset}$ and an alpha factor in consideration of a combination of a plurality of UCIs configured/indicated as having different priorities (e.g., LP or HP) and a combination of UCI and a PUSCH configured/indicated as having different priorities. For convenience of description, UCI configured/indicated as having LP/HP is referred to as LP UCI/HP UCI, respectively, and a PUSCH indicated/configured as having LP/HP is referred to as an LP PUSCH/HP PUSCH, respectively. In addition, a case where UCI multiplexed on a PUSCH includes only UCI of a specific priority XP (e.g. LP or HP) is defined as an "XP only" case, a case where UCI multiplexed on a PUSCH includes both XP UCI and UCI of a different priority YP (e.g. HP or LP) is defined as an "XP+YP" case, and a case where UCI multiplexed on a PUSCH includes at least XP UCI (e.g. "XP only" or "XP+YP") is defined as an "with XP" case.

[1] Configuration/Indication of $\beta_{offset}$ for Combination of UCI and PUSCH Having Different Priorities 1) Semi-Static $\beta_{offset}$ A. A $\beta_{offset}$ value (set) may be configured for each PUSCH priority (e.g. LP/HP) (combination). For example, for two UCI+PUSCH priority combinations {XP+XP} and {YP+XP} for XP PUSCH, 7 $\beta_{offset}$ values may be configured for each combination (if XP=LP, YP=HP, and if XP=HP, YP=LP). For example, when it is said that 7 $\beta_{offset}$ values are configurable for the combination {YP+XP}, this may be understood as configuration of (i) 7 $\beta_{offset}$ values in the case where XP>YP and (ii) 7 $\beta_{offset}$ values in the case where XP<YP, for one UE. Since (i) XP>YP and (ii) XP<YP are incompatible conditions, either (i) or (ii) may be used, and (i) and (ii) are not used together.

i. And/or, for each of two UCI cases {XP only, with YP} of the XP PUSCH, A 7 $\beta_{offset}$ values may be configured for XP UCI. For example, when only XP UCI is transmitted without YP UCI on the XP PUSCH, 7 $\beta_{offset}$ values may be configured, and when the YP UCI is also transmitted (in addition to the XP UCI) on the XP PUSCH (in each of (i) and (ii)), 7 $\beta_{offset}$ values may be configured.

ii. And/or, for each of two UCI cases {LP only, with HP} of an HP PUSCH, A 7 $\beta_{offset}$ values may be configured for LP UCI, and/or for each of two UCI cases {LP only, with HP} of an LP PUSCH, 7 $\beta_{offset}$ values may be configured for LP UCI. For example, 7 $\beta_{offset}$ values may be configured for the case where only LP UCI is transmitted on the HP PUSCH (without HP UCI), and 7 $\beta_{offset}$ values may be configured for the case where the HP UCI is also transmitted on the HP PUSCH (in addition to the LP UCI). For example, 7 $\beta_{offset}$ values may be configured for the case where only the LP UCI is transmitted on the LP PUSCH (without the HP UCI), and 7 $\beta_{offset}$ values may be configured for the case where the HP UCI is also transmitted on the LP PUSCH (in addition to the LP UCI).

B. Based on the above-described $\beta_{offset}$ configuration for each UCI+PUSCH priority combination, the UE/BS may operate to apply a $\beta_{offset}$ value configured for/corresponding to a priority combination of UCI and a PUSCH which are actually scheduled/configured.

C. For UL-SCH protection, the BS may configure/apply a small $\beta_{offset}$ value less than 1.0 including 0 for/to the UE, only for the HP PUSCH, and in the case of Semi-static $\beta_{offset}$, such a small $\beta_{offset}$ value may be configured only for LP CSI (e.g., CSI part 1 and/or part 2, or only CSI part 2).

2) Dynamic $\beta_{offset}$

Figure 8:
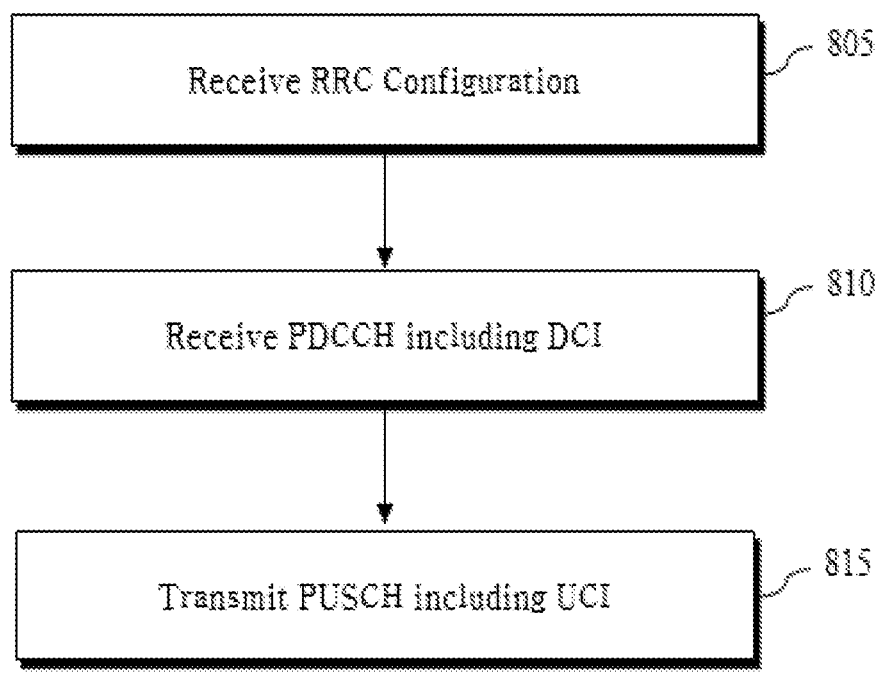
FIGS. 8 to 11 are diagrams illustrating a method of transmitting and receiving a signal according to an embodiment of the present disclosure.
Figure 9:
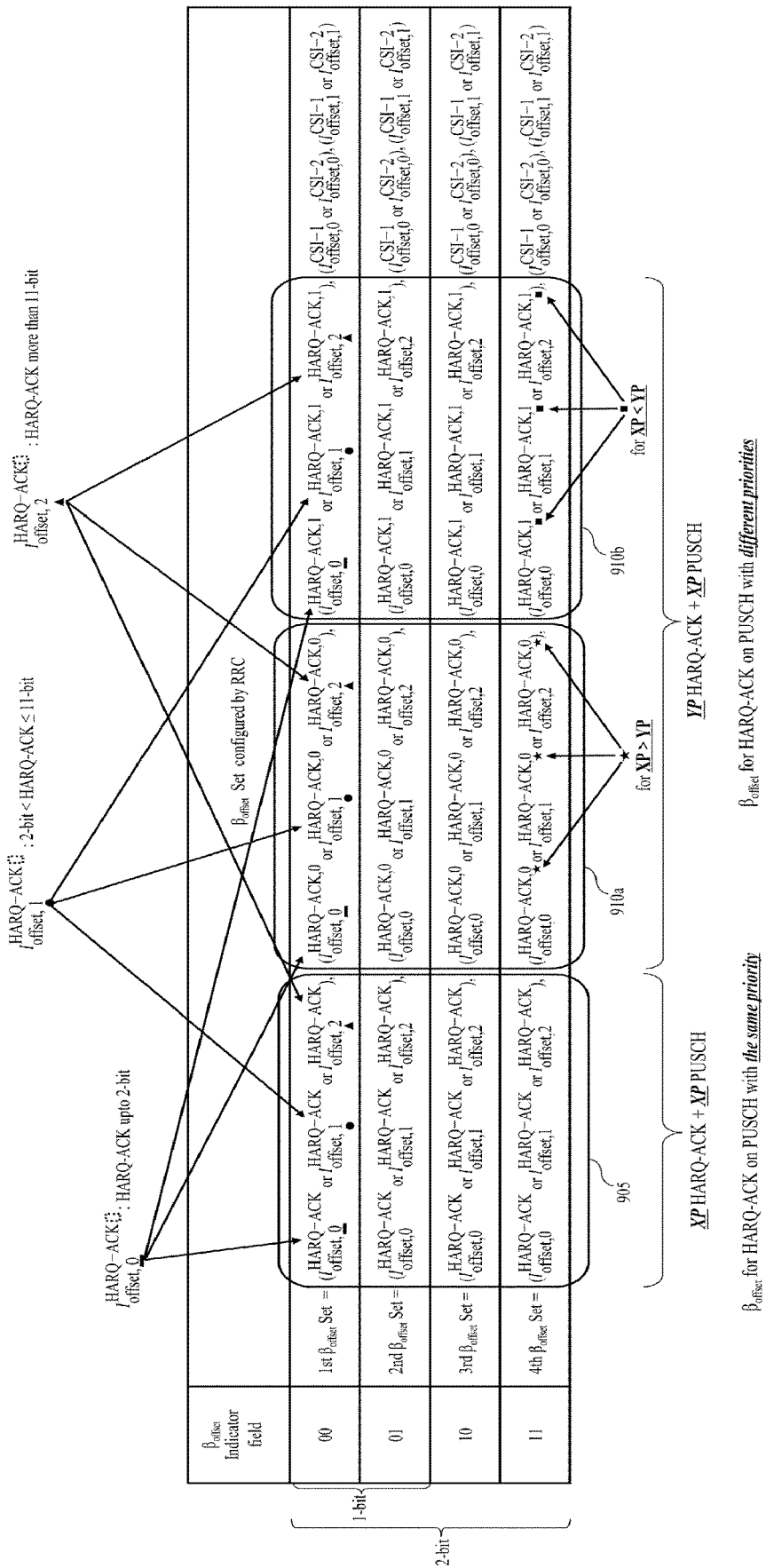

A. For a dynamic $\beta_{offset}$ operation, $\beta_{offset}$ values (sets) may be configured for each PUSCH priority (e.g., LP/HP) (e.g., RRC signaling in operation 805 of FIG. 8) and then a dynamic indication (e.g. by DCI in operation 810 of FIG. 8) may be performed. For example, for each of two UCI+PUSCH priority combinations {XP+XP} and {YP+XP} for XP PUSCH (scheduled by DCI), four $\beta_{offset}$ sets (e.g. having set indexes=0, 1, 2, and 3) may be configured by RRC signaling. For example, when it is said that 4 $\beta_{offset}$ sets are configurable for the combination {YP+XP}, this may be understood as (i) configuration of 4 $\beta_{offset}$ sets for the case where XP>YP, and (ii) configuration of 4 $\beta_{offset}$ sets for the case where XP<YP. Because (i) XP>YP and (ii) XP<YP are incompatible conditions, either (i) or (ii) may be used (e.g., DCI indication/UE selection in operation 810/815 of FIG. 8), and (i) and (ii) are not used together. Each $\beta_{offset}$ set may include 7 $\beta_{offset}$ values (e.g., Table 7/8). FIG. 9 illustrates an example referred to for describing an RRC configuration of $\beta_{offset}$ sets and a DCI indication, for a dynamic $\beta_{offset}$ operation. Referring to FIG. 9, the $\beta_{offset}$ indicator of DCI may be one or two bits. When the A $\beta_{offset}$ indicator of DCI (e.g., UL grant DCI scheduling an XP PUSCH) is one bit, two $\beta_{offset}$ sets corresponding to set indexes 0 and 1 may be RRC-configured for the UE, whereas when the $\beta_{offset}$ indicator of the DCI is two bits, four $\beta_{offset}$ sets corresponding to set indexes 00, 01, 10, and 11 may be RRC-configured for the UE. For convenience of description, it is assumed that the $\beta_{offset}$ indicator is 2 bits and dynamically indicates any one of the $\beta_{offset}$ indexes 00, 01, 10, and 11. Each $\beta_{offset}$ set includes $\beta_{offset}$ values 905 for transmitting an XP HARQ-ACK on an XP PUSCH and $\beta_{offset}$ values 910 for transmitting an YP HARQ-ACK on an XP PUSCH. In some cases, only CSI part 1/2 without an XP/YP HARQ-ACK may be transmitted on an XP PUSCH, or CSI part 1/2 may also be transmitted in addition to an XP/YP HARQ-ACK on the XP PUSCH. However, to avoid obscurity, a description of CSI part 1/2 transmission is omitted. The YP HARQ-ACK may be transmitted on the XP PUSCH in addition to the XP HARQ-ACK. In this case, the $\beta_{offset}$ values 905 and the $\beta_{offset}$ values 910 are used together. The $\beta_{offset}$ values 910 for transmitting an YP HARQ-ACK on an XP PUSCH include (i) $\beta_{offset}$ values 910a for the case where XP>YP (i.e., an LP HARQ-ACK transmission on an HP PUSCH) and (ii) $\beta_{offset}$ values 910b for the case where XP<YP (i.e., an HP HARQ-ACK transmission on an LP PUSCH). Because (i) XP>YP and (ii) XP<YP are incompatible conditions, either (i) the $\beta_{offset}$ values 910a or (ii) the $\beta_{offset}$ values 910b may be used, and (i) and (ii) are not used together. For example, even though (i) the $\beta_{offset}$ values 910a and (ii) the $\beta_{offset}$ values 910b are all configured for the UE by RRC signaling, the UE selects (i) the $\beta_{offset}$ values 910a or (ii) the $\beta_{offset}$ values 910b to transmit YP UCI on the XP PUSCH (in operation 815 of FIG. 8), depending on whether XP is HP or LP. The $\beta_{offset}$ values 905 may be used for both (i) and (ii). The UE selects any one of $I_{offset,0}^{HARQ-ACKx}$, $I_{offset,1}^{HARQ-ACKx}$, and $I_{offset,2}^{HARQ-ACKx}$ according to the payload size of a corresponding HARQ-ACK to transmit UCI on the XP PUSCH (in operation 815 of FIG. 8).

i. And/or, for each of two UCI cases {XP only, with YP} of the XP PUSCH, four A $\beta_{offset}$ sets may be configured for XP UCI. For example, when only the XP UCI is transmitted without YP UCI on the XP PUSCH, 4 $\beta_{offset}$ sets may be configured, and when the YP UCI is also transmitted (in addition to the XP UCI) on the XP PUSCH, four $\beta_{offset}$ sets may be configured (for each of the cases (i) XP>YP and (ii) XP<YP).

ii. And/or, for each of two UCI cases {LP only, with HP} of the HP PUSCH, four A $\beta_{offset}$ sets may be configured for the LP UCI, and/or for each of two UCI cases {LP only, with HP} of the LP PUSCH, four $\beta_{offset}$ sets may be configured for the LP UCI. For example, 4 $\beta_{offset}$ sets may be configured for the case where only the LP UCI is transmitted on the HP PUSCH (without the HP UCI), and 4 $\beta_{offset}$ sets may be configured for the case where the HP UCI is also transmitted on the HP PUSCH (in addition to the LP UCI). For example, 4 $\beta_{offset}$ sets may be configured for the case where only the LP UCI is transmitted on the LP PUSCH (without the HP UCI), and 4 $\beta_{offset}$ sets may be configured for the case where the HP UCI is also transmitted on the LP PUSCH (in addition to the LP UCI).

B. A set of $\beta_{offset}$ set indexes X configured for each of the above two combinations, that is, {set index X configured in the XP+XP combination, and set index X configured in the YP+XP combination} may be mapped to one state X indicated by the $\beta_{offset}$ indicator field of DCI (e.g., in operation 810 of FIG. 8, and in FIG. 9).

C. The $\beta_{offset}$ values of a set configured for/corresponding to the priority combination of a PUSCH and UCI scheduled by DCI between two sets mapped to a state indicated by the $\beta_{offset}$ indicator field of the DCI may be applied.

D. The above-described small $\beta_{offset}$ value (e.g., $\beta_{offset}$ less than 1) may be configured/applied only for/to the UCI+PUSCH combination {LP+HP}. In this case, the small $\beta_{offset}$ value may also be configured only for LP CSI (e.g., CSI part 1 and/or part 2, or only CSI part 2).

E. A semi-static $\beta_{offset}$ value may be configured for each of the priority combinations of a PUSCH and UCI for a fallback PUSCH and/or a CG PUSCH, and a $\beta_{offset}$ value configured for/corresponding to an actual UCI+PUSCH priority combination may be applied.

[2] Configuration/Indication of Alpha Factor for Combination of UCI and PUSCH Having Different Priorities 1) Semi-Static Alpha Factor A. An alpha factor may be configured for each PUSCH priority (e.g. LP/HP) (combination). For example, for each of two UCI cases {LP only, with HP} of an XP PUSCH, three UCI cases {LP only, HP only, LP+HP}, two UCI cases {XP only, with YP}, or three UCI cases {XP only, YP only, XP+YP}, an alpha factor may be configured.

i. Alternatively, an alpha factor value may be configured for each UCI priority (combination) (e.g., for each of LP UCI and HP UCI) of the XP PUSCH. In this case, the UE/BS may apply an alpha factor value configured for a specific priority of UCI in determining the number of REs to which the UCI with the specific priority is mapped.

B. Based on the above description, an alpha factor value configured for/corresponding to the priority combination (and UCI case type) of actually scheduled/configured UCI and PUSCH may be applied.

C. A small alpha factor value less than 0.5 including 0 may be configured/applied for protecting a UL-SCH (e.g., on an HP PUSCH). The small alpha factor value may be configured only for the HP PUSCH/and or LP UCI (e.g., the "LP only" case).

2) Dynamic Alpha Factor

A. Alpha factors may be RRC-configured for each PUSCH priority (e.g., LP/HP) (combination) and then dynamically indicated by DCI. For example, for each of two UCI cases {LP only, with HP}, three UCI cases {LP only, HP only, LP+HP}, two UCI cases {XP only, with YP}, or 3 UCI cases {XP only, YP only, XP+YP} of an XP PUSCH, sets (defined as "alpha factor sets") each having K (e.g. K=4) alpha factor values (e.g. having set indexes=0, 1, . . . , K−1) may be configured by RRC signaling.

i. Alternatively, alpha factor set(s) may be configured for each UCI priority (e.g., each of LP UCI and HP UCI) of the XP PUSCH. In this case, the UE may apply an alpha factor set configured for a specific priority of UCI in determining the number of REs to which the UCI with the specific priority is mapped.

B. A set of alpha factor set indexes X configured in each of the above 2 (or 3) UCI cases may be mapped to one state X indicated by a specific field (used for the purpose of indicating an alpha factor) in DCI.

i. For example, (i) two sets with {set index X configured for the "LP only" case and set index X configured for the "with HP" case}, (ii) three sets with {set index X configured for the "LP only" case, set index X configured for the "HP only" case, and set index X configured for the "LP+HP" case}, (iii) two sets with {set index X configured for the "XP only" case and set index X configured for the "with YP" case}, or (iv) three sets with {set index X configured for the "XP only" case, set index X configured for the "YP only" case, and set index X configured for the "XP+YP" case} may be configured.

C. According to the priority combination (and UCI case type) of a PUSCH and UCI scheduled by DCI, alpha factor values belonging to a set configured for/corresponding to the priority combination (and UCI case) among two (or three) sets mapped to a state indicated by the specific field of the DCI may be applied.

D. A small alpha factor value less than 0.5 including 0 may be configured/applied for UL-SCH protection, and even in this case, the small alpha factor value may also be configured only for the HP PUSCH and/or only for the LP UCI (e.g., only in the "LP only" case).

E. On the other hand, a separate semi-static alpha factor value applied when a dynamic alpha factor as described above is not indicated (e.g., a fallback PUSCH or a CG PUSCH as described above) may be configured for each combination of a PUSCH/UCI priority and a UCI case.

[3] Handling Operation Related to HP HARQ-ACK Multiplexing on LP PUSCH

1) Problematic Situation

A. In a situation in which an HP HARQ-ACK (and/or an LP HARQ-ACK and/or LP CSI) is multiplexed on an LP PUSCH, (a) the number of REs required for mapping the HP HARQ-ACK, calculated based on a $\beta_{offset}$ value indicated/configured (by DCI) for the HP HARQ-ACK (to be multiplexed on the LP PUSCH) is defined as $N_h$, and (b) the total number of available REs (to which UCI except for a DMRS/PTRS may be mapped) in PUSCH resources is defined as $N_t$ (and an alpha factor is defined as $\alpha$). Then, if $N_h > \alpha^* N_t$, or if $N_h$ is greater than a specific value less than $\alpha^* N_t$ (=M<$\alpha^* N_t$) (and if the number of REs for HP HARQ-ACK mapping is limited to {$\alpha^* N_t$} as conventionally done in this situation), the transmission performance (e.g., HP UCI reliability) of the HP HARQ-ACK may be degraded. For example, when the number of total REs available for (HP) UCI multiplexing among the total number $N_t$ of REs available for UCI on the LP PUSCH is $\alpha^* N_t$, the number of REs required for transmission of HP UCI (e.g., the HP HARQ-ACK) calculated based on the payload of the HP UCI (e.g., the HP HARQ-ACK) is $N_h$, and $N_h > \alpha^* N_t$ or $N_h$ is greater than a specific value less than $\alpha^* N_t$ (=M<$\alpha^* N_t$), HP UCI performance may be degraded due to an insufficient number of REs for the HP UCI. Solutions to the problem will be described below.

2) Proposed Methods

A. Opt 1 i. If $N_h > \alpha^* N_t$, or $N_h$ is greater than a specific value less than $\alpha^* N_t$ (=M<$\alpha^*$Nt) in multiplexing an HP HARQ-ACK (and/or an LP HARQ-ACK and/or LP CSI) on an LP PUSCH (as described above), the UE/BS may preferentially allocate $N_h$ REs for HP HARQ-ACK mapping, and allocate all of the remaining {$N_t-N_h$} REs for UL-SCH mapping. For example, the UE may drop a multiplexed transmission on the LP PUSCH, for the remaining UCI (e.g. the LP HARQ-ACK and/or the LP CSI) except for the HP HARQ-ACK. Alternatively, at least some of other UCI (e.g., HP CSI, the LP HARQ-ACK, and/or the LP CSI) and then a UL-SCH may be mapped to the remaining {$N_t-N_h$} REs.

ii. Alternatively, in this case, the UE/BS may determine the number of REs to be allocated for mapping of the HP UCI, the LP UCI, and the UL-SCH, on the assumption of a specific alpha value (e.g., alpha=1.0). For example, even though an alpha factor actually configured for the UE is a first value (e.g., the first value <1), the UE/BS may operate (exceptionally), assuming that an alpha factor of a second value (e.g., the second value=1) is configured for the UE in a situation in which $N_h > \alpha^* N_t$ or $N_h > M$. A UE operation may be defined such that the above-described operation of performing UCI multiplexing/mapping on the LP PUSCH on the assumption of the specific alpha factor (e.g., the second value=1), instead of the actually configured alpha factor (e.g., the first value <1) is limited only to the situation in which $N_h > \alpha^* N_t$ or $N_h > M$, or is always applied in a situation in which the HP HARQ-ACK is multiplexed on the LP PUSCH.

B. Opt 2 i. If $N_h > \alpha^* N_t$ or $N_h > M$ in multiplexing an HP HARQ-ACK (and/or an LP HARQ-ACK and/or LP CSI) on an LP PUSCH (as described above), the LP PUSCH transmission may be dropped and all UCI (e.g. an LP HARQ-ACK and/or LP CSI) including the HP HARQ-ACK is transmitted on a PUCCH (by multiplexing) or on a PUSCH other than the LP PUSCH by multiplexing. For example, if $N_h > \alpha^* N_t$ or $N_h > M$ in multiplexing the HP HARQ-ACK (and/or the LP HARQ-ACK and/or the LP CSI) on the LP PUSCH, first UCI including at least the HP HARQ-ACK may be transmitted on a first PUCCH, while the LP PUSCH transmission may be dropped. For example, the first UCI may further include HP UCI (e.g., HP CSI) and/or an LP HARQ-ACK (according to a corresponding PUCCH resource/format). For example, the first PUCCH may be an HP PUCCH or an LP PUCCH. For example, the first PUCCH may be located in the first place in the time domain among HP/LP PUCCHs.

C. Opt 3 i. If $N_h > \alpha^* N_t$ or $N_h > M$ in multiplexing an HP HARQ-ACK (and/or an LP HARQ-ACK and/or LP CSI) on an LP PUSCH (as described above), the UE may map only UCI including the HP HARQ-ACK on the LP PUSCH, while dropping a UL-SCH mapping/transmission. For example, in the presence of other UCI (e.g. the LP HARQ-ACK and/or the LP CSI) to be transmitted, in addition to the HP HARQ-ACK, the UE may first allocate $N_h$ REs for HP HARQ-ACK mapping. On the contrary, in the absence of other UCI to be transmitted in addition to the HP HARQ-ACK, the UE may allocate all $N_t$ REs for the HP HARQ-ACK mapping. In the latter case, the HP HARQ-ACK may be mapped to $N_t$ REs more than $N_h$.

Figure 10:
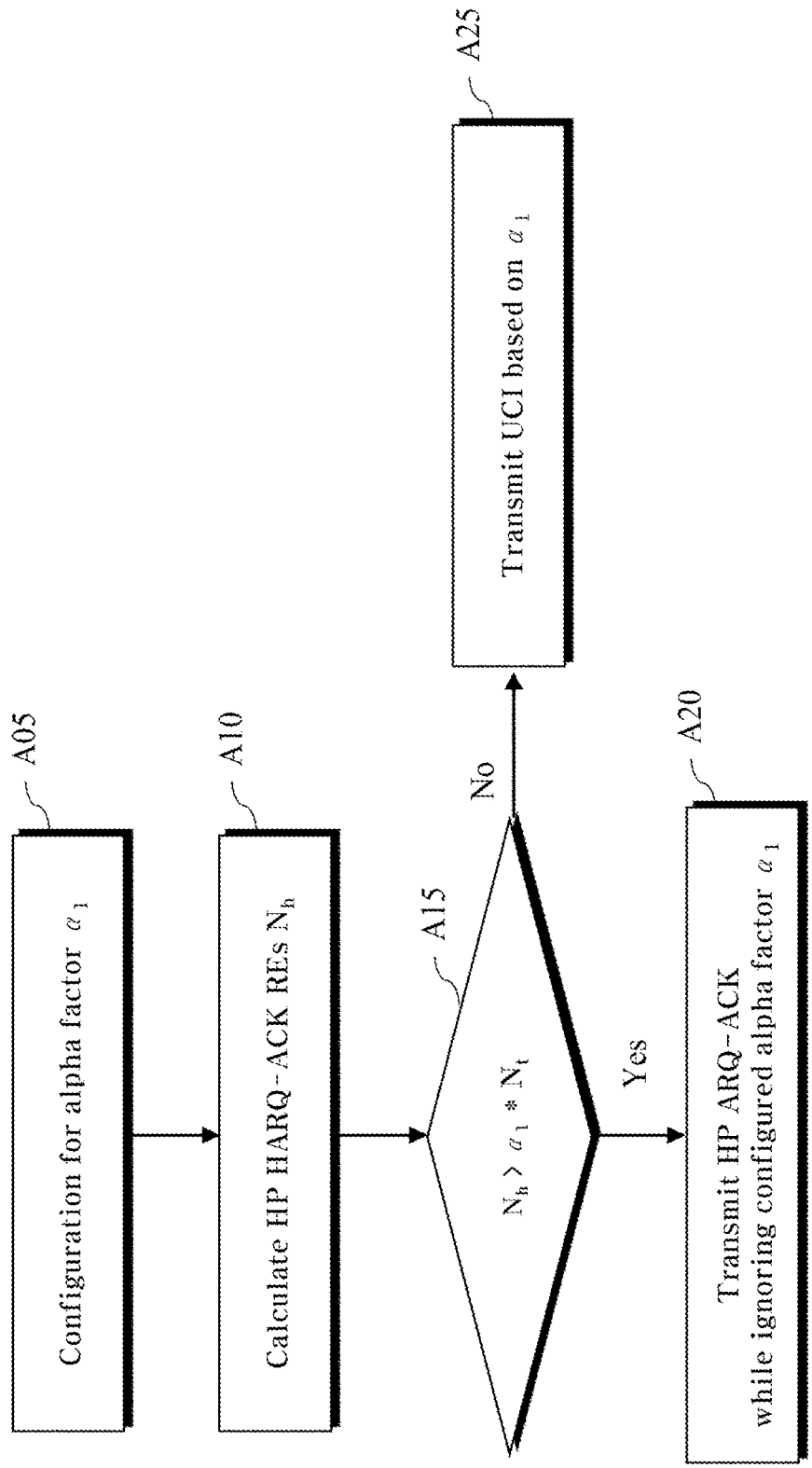

D. Note i. In the above examples, one of Opt 1, Opt 2, and Opt 3 may always be applied regardless of a PUCCH/UCI combination overlapping in time with an LP PUSCH. Alternatively, Case 1) when an LP HARQ-ACK is not included in the PUCCH/UCI overlapping in time with the LP PUSCH, Opt 1 may be applied, and Case 2) (the HP HARQ-ACK and) the LP HARQ-ACK is included in the PUCCH/UCI overlapping in time with the LP PUSCH, one of Opt 2 and Opt 3 may be applied.

ii. Since the above-described "2) Proposed Methods" is related to an alpha factor (e.g., determination/lack of the number of UCI REs), it may be implemented together within a range that does not conflict with Semi-static/Dynamic $\beta_{offset}$ described above, or each may be carried out individually.

iii. FIG. 10 is a diagram illustrating an embodiment of "2) Proposal Methods". Referring to FIG. 10, a UE may receive at least one alpha factor including $\alpha_1$ by higher-layer signaling (A05). The UE calculates the number $N_h$ of REs required for an HP HARQ-ACK transmission in a situation where an HP HARQ-ACK needs to be transmitted on an LP PUSCH (A10). Unless $N_h > \alpha 1 * N_t$ or $N_h > M$, the UE may transmit UCI including an HP HARQ-ACK on an LP PUSCH based on $\alpha 1$ configured through higher-layer signaling (A25). If $N_h > \alpha 1 * N_t$ or $N_h > M$, the UE may transmit UCI including the HP HARQ-ACK (while ignoring $\alpha 1$ configured through higher-layer signaling) (A20). For example, the HP HARQ-ACK may be transmitted on a PUCCH or in $N_h$ REs on the LP PUSCH (e.g., Opt 1/2/3).

Figure 11:
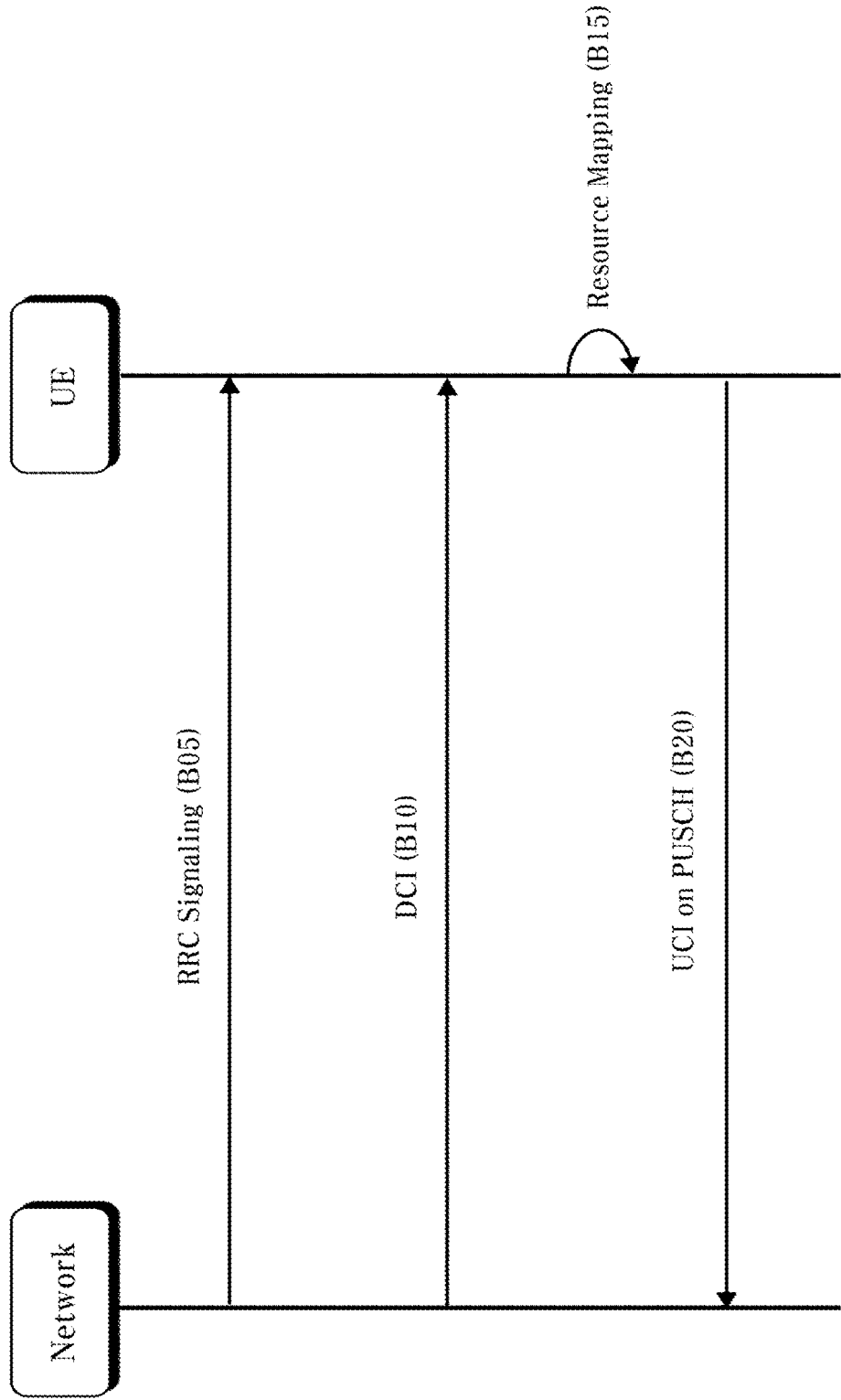

FIG. 11 illustrates an implementation example of a method of transmitting and receiving a signal according to an embodiment of the present disclosure. FIG. 11 is for helping the understanding of the foregoing examples, not limiting the scope of the present disclosure. A redundant description may be avoided, and the foregoing description may be referred to, when needed.

Referring to FIG. 11, a UE may receive information about a plurality of beta offset ($\beta_{offset}$) values for determining the number of REs of UCI to be transmitted on a PUSCH (B05).

The UE may receive DCI scheduling a first PUSCH (B10).

The UE may map first UCI including a first HARQ-ACK on the first PUSCH, based on the plurality of beta offset values and a beta offset indicator included in the DCI (B15).

The UE may transmit the first PUSCH (B20).

The UE may be configured to map the first HARQ-ACK on the first PUSCH, even though a priority of the first HARQ-ACK is different from a priority of the first PUSCH.

The plurality of beta offset values may include first beta offset values for a case where the priority of the first HARQ-ACK is identical to the priority of the first PUSCH, and second beta offset values for a case where the priority of the first HARQ-ACK is different from the priority of the first PUSCH.

The UE may select a beta offset value indicated by the beta offset indicator included in the DCI from among the first beta offset values or the beta offset value indicated by the beta offset indicator included in the DCI from among the second beta offset values, based on the priority of the first HARQ-ACK.

N field states that can be indicated through the beta offset indicator included in the DCI may be related to N beta offset indexes.

The first beta offset values may include beta offset values for each of the N field states, and the second beta offset values may include beta offset values for each of the N field states. For example, a specific one of the N field states may be indicated by the DCI. The UE may determine the number of REs for the first UCI to be mapped on the first PUSCH based on the first beta offset values and the second beta offset values configured for the indicated specific state.

The beta offset indicator included in the DCI may be 2 bits, and the N field states may be related to beta offset set indexes {00, 01, 10, 11}. For example, the first beta offset values may include beta offset values for each of the four beta offset set indexes {00, 01, 10, 11}, and the second beta offset values may include beta offset values for each of the four beta offset set indexes {00, 01, 10, 11}.

The second beta offset values may include (i) beta offset values for a case where the priority of the first HARQ-ACK is higher than the priority of the first PUSCH, and (ii) beta offset values for a case where the priority of the first HARQ-ACK is lower than the priority of the first PUSCH. For example, the UE may select (i) the beta offset values for a case where the priority of the first HARQ-ACK is higher than the priority of the first PUSCH or (ii) the beta offset values for a case where the priority of the first HARQ-ACK is lower than the priority of the first PUSCH, from among the second beta offset values based on whether the priority of the first PUSCH is a first priority or a second priority higher than the first priority.

The mapping of the first UCI on the first PUSCH may include calculating the total number '$N_t$' of available UCI REs on the first PUSCH based on a first alpha value $\alpha_1$ configured through higher-layer signaling; and calculating 'M' which is a number of REs for mapping the first HARQ-ACK, based on the plurality of beta offset values and a specific beta offset value determined based on the beta offset indicator included in the DCI. For example, based on the first HARQ-ACK having the second priority higher than the first priority and 'M' being greater than '$\alpha_1 * N_t$', the UE may map only UCI including the first HARQ-ACK to the total '$N_t$' REs on the first PUSCH. For example, based on the first HARQ-ACK having the second priority higher than the first priority and 'M' being greater than '$\alpha_1 * N_t$', the UE may map the first HARQ-ACK to specific 'M' REs among the total '$\alpha_2 * N_t$' REs, assuming that a second alpha value $\alpha_2$ is configured through higher-layer signaling. Preferably, one of {0.5, 0.65, 0.8, 1.0} may be configured as the first alpha value through higher-layer signaling, and the second alpha value may be fixed to 1.

For example, based on the first HARQ-ACK having the second priority higher than the first priority and 'M' being greater than '$\alpha_1 * N_t$', the UE may transmit only the first HARQ-ACK on a PUCCH, while dropping the transmission of the first PUSCH, or multiplex and transmit the first HARQ-ACK on a second PUSCH other than the first PUSCH.

Figure 12:
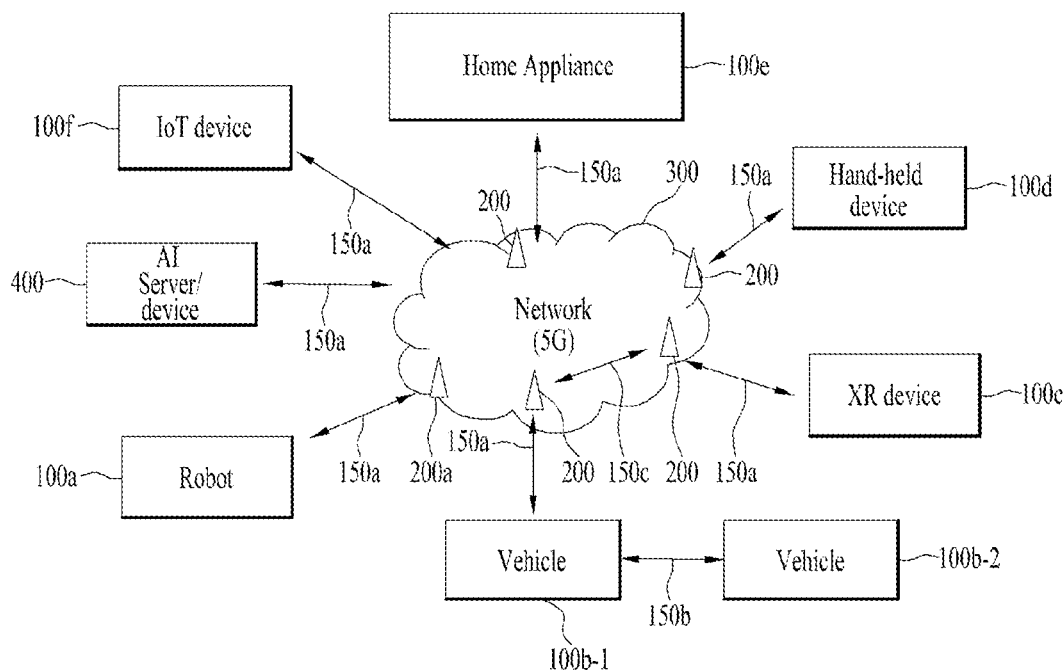
FIGS. 12 to 15 are diagrams illustrating an example of a communication system 1 and wireless devices applicable to the present disclosure.

FIG. 12 illustrates a communication system 1 applied to the present disclosure.

Referring to FIG. 12, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
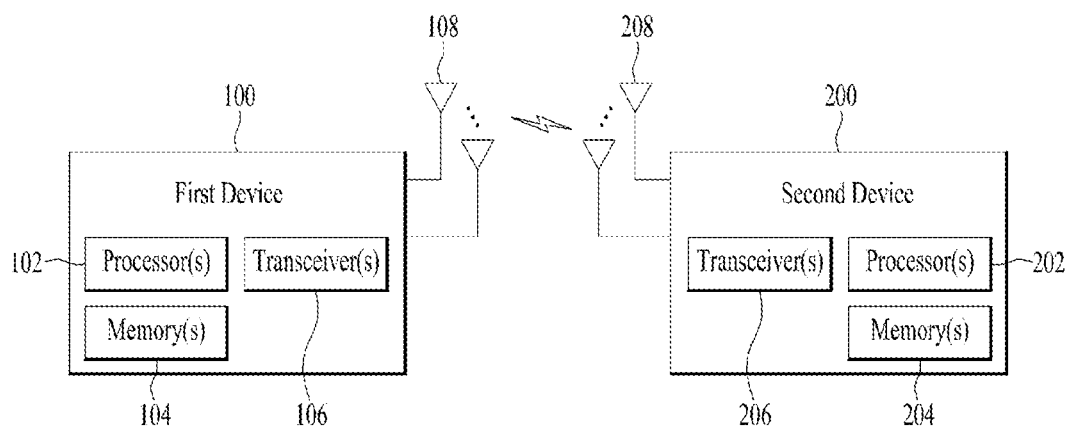

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
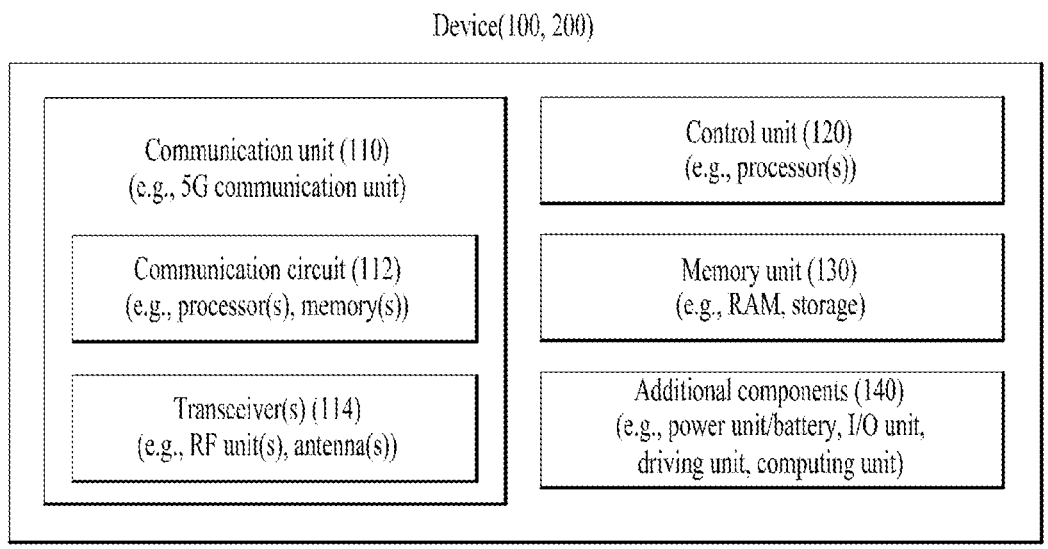

FIG. 14 illustrates another example of a wireless device applied to the present disclosure. The wireless device may be implemented in various forms according to a use-case/service (refer to FIG. 12).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
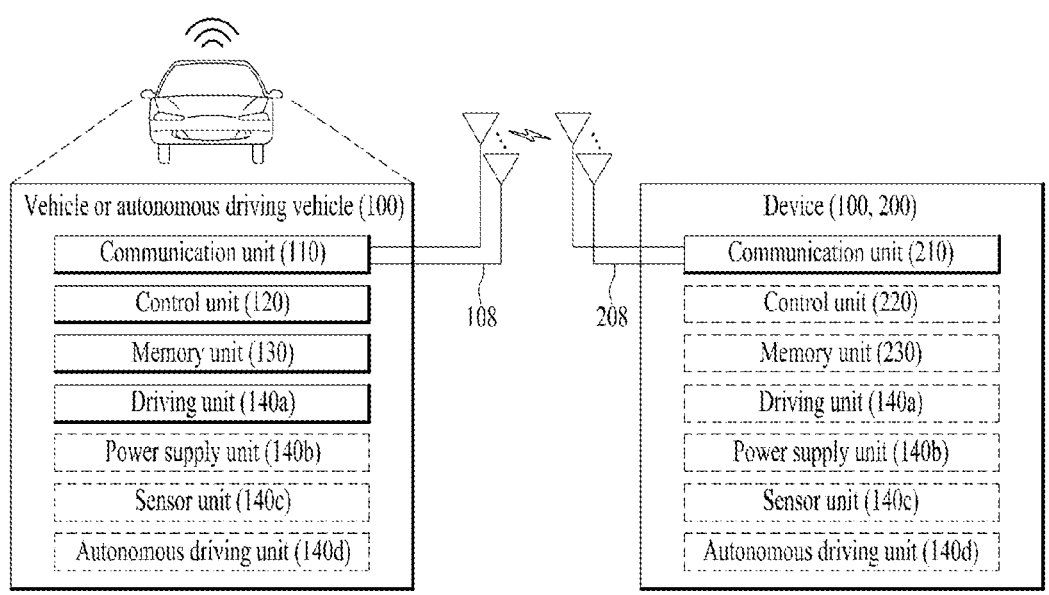

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
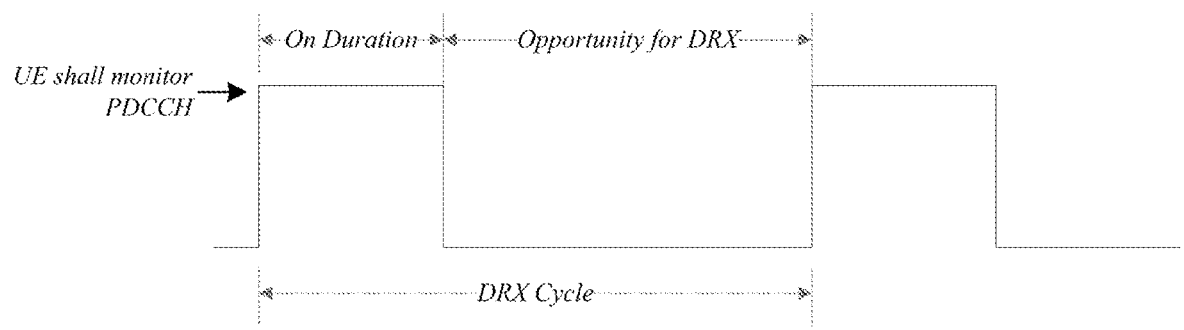
FIG. 16 is a diagram illustrating an example of a discontinuous reception (DRX) operation applicable to the present disclosure.

FIG. 16 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 9

| | Type of signals | UE procedure |
|---|---|---|
| 1st step | RRC signalling(MAC-CellGroupConfig) | Receive DRX configuration information |
| 2nd Step | MAC CE((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

The invention claimed is:

1. A method of transmitting a signal by a user equipment (UE) in a wireless communication system, the method comprising:
   receiving beta offset information including a first beta offset set and a second beta offset set;
   receiving downlink control information (DCI) for scheduling a physical uplink shared channel (PUSCH), and
   transmitting uplink control information (UCI) including a hybrid automatic repeat request-acknowledgement (HARQ-ACK) through the PUSCH based on a beta offset value for the HARQ-ACK,
   wherein based on that a priority of the UCI is identical to a priority of the PUSCH, the beta offset value for the HARQ-ACK is determined based on the first beta offset set in the beta offset information and a beta offset indicator included in the DCI, and
   wherein based on that the priority of the UCI is different from the priority of the PUSCH, the beta offset value for the HARQ-ACK is determined based on the second beta offset set in the beta offset information and the beta offset indicator in the DCI.

2. The method of claim 1, wherein the first beta offset set includes a plurality of first beta offset values, and the second beta offset set includes a plurality of second beta offset values.

3. The method of claim 1,
   wherein based on that the priority of the UCI is identical to the priority of the PUSCH, the beta offset value for the HARQ-ACK is indicated by the beta offset indicator from among a plurality of first beta offset values included in the first beta offset set, and
   wherein based on that the priority of the UCI is different from the priority of the PUSCH, the beta offset value for the HARQ-ACK is indicated by the beta offset indicator from among a plurality of second beta offset values included in the second beta offset set.

4. The method of claim 1,
   wherein based on that the priority of the UCI is higher than the priority of the PUSCH, the beta offset value for the HARQ-ACK is indicated by the beta offset indicator from among a first subset of the second beta offset set, and
   wherein based on that the priority of the UCI is lower than the priority of the PUSCH, the beta offset value for the HARQ-ACK is indicated by the beta offset indicator from among a second subset of the second beta offset set.

5. The method of claim 1, wherein the second beta offset set includes beta offset values for a case of the priority of the UCI being higher than the priority of the PUSCH, and beta offset values for a case of the priority of the UCI being lower than the priority of the PUSCH.

6. The method according to claim 1, wherein a number of resource elements (REs) for the UCI is determined based on the beta offset value.

7. The method according to claim 1, wherein the UE performs, based on the beta offset value and a number of UCI resource elements (REs) available in the PUSCH, an HARQ-ACK rate matching for determining a number of modulation symbols of the HARQ-ACK.

8. The method according to claim 1,
   wherein the beta offset indicator included in the DCI is set to one of {00, 01, 10, 11} states, and
   wherein the first beta offset set values includes beta offset values for each of the {00, 01, 10, 11} states, and the second beta offset set includes beta offset values for each of the {00, 01, 10, 11} states.

9. The method according to claim 1, wherein:
the UE determines '$N_t$' which is a total number of UCI resource elements (REs) available in the PUSCH, based on a first alpha value ($\alpha_1$) configured through higher-layer signaling; and
the UE determines 'M' which is a number of REs for the HARQ-ACK, based on the beta offset value.

10. The method according to claim 9, wherein, based on the HARQ-ACK having a second priority higher than a first priority and 'M' being greater than '$\alpha_1 * N_t$', the UE maps the UCI including only the HARQ-ACK to the total '$N_t$' UCI REs in the PUSCH.

11. The method according to claim 9, wherein, based on the HARQ-ACK having a second priority higher than a first priority and 'M' being greater than '$\alpha_1 * N_t$', the UE maps the HARQ-ACK to 'M' REs among '$a_2 * N_t$' REs by assuming that a second alpha value ($\alpha_2$) is configured through higher-layer signaling.

12. The method according to claim 11, wherein one of {0.5, 0.65, 0.8, 1.0} is configured as the first alpha value through higher-layer signaling, and
wherein the second alpha value is fixed to 1.

13. The method according to claim 1, wherein the wireless communication system includes a 3rd generation partnership project (3GPP)-based wireless communication system.

14. A non-transitory processor-readable medium storing instructions for performing the method according to claim 1.

15. A device for wireless communication, the device comprising:
a memory configured to store instructions; and
a processor configured to perform operations by executing the instructions, the operations comprising:
receiving beta offset information including a first beta offset set and a second beta offset set;
receiving downlink control information (DCI) for scheduling a physical uplink shared channel (PUSCH), and
transmitting uplink control information (UCI) including a hybrid automatic repeat request-acknowledgement (HARQ-ACK) through the PUSCH based on a beta offset value for the HARQ-ACK,
wherein based on that a priority of the UCI is identical to a priority of the PUSCH, the beta offset value for the HARQ-ACK is determined based on the first beta offset set in the beta offset information and a beta offset indicator included in the DCI, and
wherein based on that the priority of the UCI is different from the priority of the PUSCH, the beta offset value for the HARQ-ACK is determined based on the second beta offset set in the beta offset information and the beta offset indicator in the DCI.

16. The device of claim 15, further comprising:
a transceiver configured to transmit or receive a wireless signal under control of the processor,
wherein the device is a user equipment (UE) configured to operate in a wireless communication system.

17. The device of claim 15, wherein the device is an application specific integrated circuit (ASIC) or a digital signal processing device configured control a user equipment (UE) to operate in a wireless communication system.

18. A method of receiving a signal by a base station (BS) in a wireless communication system, the method comprising:
transmitting beta offset information including a first beta offset set and a second beta offset set;
transmitting downlink control information (DCI) for scheduling a physical uplink shared channel (PUSCH), and
receiving uplink control information (UCI) including a hybrid automatic repeat request-acknowledgement (HARQ-ACK) through the PUSCH based on a beta offset value for the HARQ-ACK,
wherein based on that a priority of the UCI is identical to a priority of the PUSCH, the beta offset value for the HARQ-ACK is determined based on the first beta offset set in the beta offset information and a beta offset indicator included in the DCI, and
wherein based on that the priority of the UCI is different from the priority of the PUSCH, the beta offset value for the HARQ-ACK is determined based on the second beta offset set in the beta offset information and the beta offset indicator in the DCI.

19. A base station (BS) for wireless communication, the BS comprising:
a transceiver; and
a processor configured to control the transceiver to:
transmit beta offset information including a first beta offset set and a second beta offset set;
transmit downlink control information (DCI) for scheduling a physical uplink shared channel (PUSCH), and
receive uplink control information (UCI) including a hybrid automatic repeat request-acknowledgement (HARQ-ACK) through the PUSCH based on a beta offset value for the HARQ-ACK,
wherein based on that a priority of the UCI is identical to a priority of the PUSCH, the beta offset value for the HARQ-ACK is determined based on the first beta offset set in the beta offset information and a beta offset indicator included in the DCI, and
wherein based on that the priority of the UCI is different from the priority of the PUSCH, the beta offset value for the HARQ-ACK is determined based on the second beta offset set in the beta offset information and the beta offset indicator in the DCI.

* * * * *